United States Patent [19]

Dörr et al.

[11] Patent Number: 4,512,939
[45] Date of Patent: Apr. 23, 1985

[54] METHOD FOR MANUFACTURING OXIDIC SINTERED NUCLEAR FUEL BODIES

[75] Inventors: Wolfgang Dörr, Herzogenaurach; Gerhard Gradel, Eckersdorf; Martin Peehs, Bubenreuth; Reinhard Schäfer, Rodenbach; Thomas Sondermann, Kahl, all of Fed. Rep. of Germany

[73] Assignees: Kraftwerk Union Aktiengesellschaft, Mülheim; Reaktor Brennelement Union GmbH, Hanau, both of Fed. Rep. of Germany

[21] Appl. No.: 431,615

[22] Filed: Sep. 30, 1982

[30] Foreign Application Priority Data

Nov. 11, 1981 [DE] Fed. Rep. of Germany ....... 3144684

[51] Int. Cl.$^3$ .............................................. G21C 21/00
[52] U.S. Cl. ..................... 264/0.5; 252/638; 423/15
[58] Field of Search ................ 264/0.5; 423/11, 15; 252/638

[56] References Cited

U.S. PATENT DOCUMENTS

| | | | |
|---|---|---|---|
| 3,344,081 | 9/1967 | Elyard et al. | 252/638 |
| 3,374,178 | 3/1968 | May et al. | 252/638 |
| 3,862,908 | 1/1975 | Fitch et al. | 423/11 X |
| 4,094,738 | 6/1975 | Chubb | 264/0.5 X |
| 4,119,563 | 10/1978 | Kadner et al. | 264/0.5 X |
| 4,278,560 | 7/1981 | Sondermann | 252/638 |
| 4,409,157 | 10/1983 | Haas et al. | 423/15 |

*Primary Examiner*—Leland A. Sebastian
*Attorney, Agent, or Firm*—Herbert L. Lerner; Laurence A. Greenberg

[57] ABSTRACT

Method for the manufacture of oxidic sintered nuclear fuel bodies by compacting $UO_2$-starting powder or a mixture of $UO_2$- and $PuO_2$ starting powder which contains up to 10% by weight rare-earth oxide, especially $Gd_2O_3$, as an additive into blanks and subsequent densification of these blanks by a heat treatment in a sintering atomsphere with reducing action. The $UO_2$-starting powder used for compacting has a specific surface in the range of 2 to 4.5 m$^2$/g and/or a mean crystallite diameter in the range of 80 nm to 250 nm, and the heat treatment in the sintering atmosphere with reducing action is carried out at a temperature in the range of 1,500° C. to 1,750° C.

12 Claims, No Drawings

METHOD FOR MANUFACTURING OXIDIC SINTERED NUCLEAR FUEL BODIES

BACKGROUND OF THE INVENTION

1. Field of the Invention

The invention relates to a method for manufacturing oxidic sintered nuclear fuel bodies by compacting $UO_2$-starting powder or a mixture of $UO_2$ and $PuO_2$-starting powder which contains up to 10% by weight rare-earth oxide, especially $Gd_2O_3$, as an additive, into blanks and subsequent densification of these blanks by a heat treatment in a sintering atmosphere with reducing action.

2. Description of the Prior Art

Such a method is known from German Published Non-Prosecuted Application No. 29 39 415 (corresponding U.S. application Ser. No. 190,981, filed Sept. 26, 1980, now U.S. Pat. No. 4,438,050). The heat treatment of the blanks is performed in this known method initially in a sintering atmosphere with oxidizing action at 800° to 1,400° C. for a time of 15 minutes to two hours and only then in a sintering atmosphere with reducing action at a temperature of above 1,650° C. for a time of thirty minutes to four hours.

During the heat treatment in the oxidizing atmosphere, the blanks pass at the relatively low treatment temperature into an overstoichiometric state, in which the development of sintering-inhibiting phases $(U, Gd)O_{2\pm y}$ is not activated, which would permit the development of high sintering densities in the blanks only after very long sintering times.

With the known method, oxidic sintered nuclear fuel bodies are obtained which contain a rare earth element, for instance, gadolinium as a neutron poison which can burn up neutron-physically, and the sintering density of which is more than 90% of its theoretically possible density, and therefore liberate relatively few gaseous or highly volatile nuclear fission products in an operating nuclear reactor. Fuel rods which contain sintered nuclear fuel bodies obtained by known methods therefore develop at most a small overpressure in the fuel rod cladding tubes. During operation in the nuclear reactor, no shrinkage and no local overheating of these sintered nuclear fuel bodies occurs, either of which would lead to fuel rod defects.

SUMMARY OF THE INVENTION

It is an object of the invention to simplify the known method still further so that losses in the sintering density of the sintered nuclear fuel bodies need not be tolerated.

With the foregoing and other objects in view, there is provided in accordance with the invention a method for the manufacture of oxidic sintered nuclear fuel bodies by compacting $UO_2$-starting powder or a mixture of $UO_2$- and $PuO_2$ starting powder which contains up to 10% by weight rare-earth oxide as an additive, into blanks and subsequent densification of these blanks by a heat treatment in a sintering atmosphere with reducing action, the improvement comprising using $UO_2$-starting powder for compacting which has at least one of the two properties consisting of a specific surface in the range of 2 to 4.5 m²/g and a mean crystallite diameter in the range of 80 nm to 250 nm, and that the heat treatment in the sintering atmosphere with reducing action is carried out at a temperature in the range of 1,500° C. to 1,750° C.

Other features which are considered as characteristic for the invention are set forth in the appended claims.

Although the invention is illustrated and described herein as embodied in a method for manufacturing oxidic sintered nuclear fuel bodies, it is nevertheless not intended to be limited to the details shown, since various modifications may be made therein without departing from the spirit of the invention on and within the scope and range of equivalents of the claims.

The invention, however, together with additional objects and advantages thereof will be best understood from the following description.

DETAILED DESCRIPTION OF THE INVENTION

A method for manufacturing oxidic sintered nuclear fuel bodies of the type mentioned at the outset is characterized according to the invention by the features that $UO_2$-starting powder is used for compacting which has a specific surface in the range of 2 to 4.5 m²/g and/or a mean crystallite diameter in the range of 80 to 250 nm, and that the heat treatment is performed in the sintering atmosphere with reducing action at a temperature in the range of 1,500° C. to 1,750° C.

It was found that $UO_2$-starting powder with such a relatively small specific surface and/or such a relatively large mean crystallite diameter which is not particularly fine-pore and therefore cannot be densified easily, shows a great readiness to be densified at relatively high heat treatment temperatures if it contains rare-earth oxide such as $Gd_2O_3$ as an admixture. A heat treatment in a sintering atmosphere with oxidizing action before or also after the heat treatment in the sintering atmosphere with the reducing action can be omitted without impairing the sintering density of the sintered nuclear fuel bodies obtained from the $UO_2$-starting powder.

While it is customary to process $UO_2$-starting powder into oxidic sintered nuclear fuel bodies containing rare earth elements, it was not possible to compact this $UO_2$-starting powder directly and to subject it to a heat treatment for sintering purposes. The $UO_2$-starting powder had to be milled first in order to obtain a high sintering density of the sintered nuclear fuel bodies, forming a mean surface larger than 4.5 m²/g and a mean crystallite diameter larger than 250 nm, then mixed with rare-earth oxide in powder form, precompacted and subsequently granulated to fluid and extrudable granulates. Only these granulates were compacted into blanks which were finally subjected to a heat treatment for sintering purposes, forming the sintered nuclear fuel bodies. Such pregranulation of the $UO_2$-starting powder can likewise be eliminated, in contrast thereto, in the method according to the invention.

The $UO_2$-starting powder which can be used for the method according to the invention may be ungranulated uranium dioxide powder directly obtained by the so-called ADU method according to "Gmelin Handbuch der Anorganischen Chemie", Uranium, Supplement Volume A3, pages 99 to 101, 1981. However, ungranulated uranium dioxide powder obtained by the so-called AUC method according to "Gmelin Handbuch der Anorganischen Chemie, Urnaium, Supplement Volume A3, pages 101 to 104, 1981, can also be used if the residence times of the powder under pyrohydrolysis conditions were chosen accordingly.

It is economical to hold, in the method according to the invention, the temperature of the blanks during the heat treatment for a holding period in the range of one hour to ten hours. In this time period, an optimum density of the sintered nuclear fuel bodies is obtained; a heat treatment of longer duration does not improve this density but may, under some conditions, lead to a swelling of the sintered nuclear fuel bodies.

It is furthermore advantageous to heat the blanks to the temperature of the heat treatment at a heating-up rate in the range of 1° C./min to 10° C./min. This assures sufficient time is provided for the densification processes which begin in the blanks already in the heating-up phase.

The invention and its advantages will be explained in greater detail by a comparison example and two embodiment examples:

As the comparison example, ungranulated $UO_2$-starting powder with a specific surface of 6.6 $m^2/g$ and a mean crystallite diameter of 30 nm, obtained by the AUC method according to the Gmelin Handbuch, was mixed with 6.5% by weight $Gd_2O_3$-powder and compacted into blanks with a blank density of 5.6 $g/cm^3$. These blanks were then heated in a sintering furnace in a pure hydrogen atmosphere with reducing action at a heating-up rate of 10° C./min to 1,750° C. and held at this temperature for two hours. After cooling down, the sintered nuclear fuel bodies obtained from the so-treated blanks had a density of 9.81 $g/cm^3$, which corresponds to 91.7% of their theoretically possible density.

As the first embodiment example, ungranulated $UO_2$-starting powder prepared by the AUC method according to the Gmelin Handbuch was likewise used, which, however, had been brought through an increased residence time under pyrohydrolysis conditions to a specific surface of 5.3 $m^2/g$ and a mean crystallite diameter of 110 nm. This ungranulated $UO_2$ starting powder was likewise compacted, after mixing with 6.5% by weight $Gd_2O_3$ powder, into blanks with a density of 5.6 $g/cm^3$, which were heated up and sintered under the same conditions as in the comparison example. From the blanks treated in this manner were obtained sintered nuclear fuel bodies with a density of 10 $g/cm^3$, i.e., 93.4% of the theoretically possible density.

In a second embodiment example, $UO_2$-starting powder obtained by the AUC method according to the Gmelin Handbuch was again used ungranulated, the dwelling or residence time under pyrohydrolysis conditions of which, however, was so long that a specific surface of 4.4 $m^2/g$ and a mean crystallite diameter of 140 nm was obtained. This $UO_2$-starting powder was mixed with 6.5% by weight $Gd_2O_3$-powder and compacted into blanks with a density of 5.6 $g/cm^3$, which were subsequently subjected to the same sintering conditions as in the comparison example and the first embodiment example. The sintered nuclear fuel bodies so obtained had a density of 10.17 $g/cm^3$, which corresponds to 95.1% of their theoretically possible density.

We claim:

1. In a method for the manufacture of oxidic sintered nuclear fuel bodies by compacting $UO_2$-starting powder or a mixture of $UO_2$ and $PuO_2$ starting powder which contains up to 10% by weight rare-earth oxide as an additive into blanks and subsequent densification of these blanks by a heat treatment in a sintering atmosphere with reducing action, the improvement comprising compacting $UO_2$-starting powder which has at least one of the two properties consisting of a specific surface in the range of 2 to 4.5 $m^2/g$ and a mean crystallite diameter in the range of 80 nm to 250 nm, and carrying out the heat treatment in the sintering atmosphere with reducing action at a temperature in the range of 1,500° C. to 1,750° C.

2. Method according to claim 1, wherein the rare earth oxide is $Gd_2O_3$.

3. Method according to claim 1, wherein the temperature of the blanks is held during the heat treatment for a holding time in the range of one hour to ten hours.

4. Method according to claim 1, wherein the blanks are heated up at a heating-up rate in the range of 1° C./min to 10° C./min to the temperature of the heat treatment.

5. In a method for the manufacture of oxidic sintered nuclear fuel bodies by compacting $UO_2$-starting powder or a mixture of $UO_2$- and $PuO_2$ starting powder which contains up to 10% by weight rare-earth oxide as an additive into blanks and subsequent densification and these blanks by a heat treatment in a sintering atmosphere with reducing action, the improvement comprising compacting $UO_2$-starting powder which has a specific surface in the range of 2 to 4.5 $m^2/g$ and carrying out the heat treatment in the sintering atmosphere with reducing action at a temperature in the range of 1,500° C. to 1,750° C.

6. Method according to claim 5, wherein the rare earth oxide is $Gd_2O_3$.

7. Method according to claim 5, wherein the temperature of the blanks is held during the heat treatment for a holding time in the range of one hour to ten hours.

8. Method according to claim 5, wherein the blanks are heated up at a heating-up rate in the range of 1° C./min to 10° C./min to the temperature of the heat treatment.

9. In a method for the manufacture of oxidic sintered nuclear fuel bodies by compacting $UO_2$-starting powder or a mixture of $UO_2$- and $PuO_2$ starting powder which contains up to 10% by weight rare-earth oxide as an additive into blanks and subsequent densification of these blanks by heat treatment in a sintering atmosphere with reducing action, the improvement comprising compacting $UO_2$- starting powder which has a mean crystallite diameter in the range of 80 nm to 250 nm, and carrying out the heat treatment in the sintering atmosphere with reducing action is carried out at a temperature in the range of 1,500° C. to 1,750° C.

10. Method according to claim 9, wherein the rare-earth oxide is $Gd_2O_3$.

11. Method according to claim 9, wherein the temperature of the blanks is held during the heat treatment for a holding time in the range of one hour to ten hours.

12. Method according to claim 9, wherein the blanks are heated up at a heating-up rate in the range of 1° C./min to 10° C./min to the temperature of the heat treatment.

* * * * *